United States Patent [19]
Waclawsky et al.

[11] Patent Number: 5,748,925
[45] Date of Patent: May 5, 1998

[54] DYNAMIC REALTIME ROUTING IN A DATA COMMUNICATIONS NETWORK

[75] Inventors: John G. Waclawsky, Frederick, Md.; Paul C. Hershey, Manassas, Va.; Raymond F. Daugherty, Mt. Airy, Md.

[73] Assignee: International Business Machines Corporation, Armonk, N.Y.

[21] Appl. No.: 573,586

[22] Filed: Dec. 15, 1995

Related U.S. Application Data

[63] Continuation of Ser. No. 187,949, Jan. 26, 1994, abandoned.

[51] Int. Cl.⁶ .................................................. G06F 13/00
[52] U.S. Cl. .................................................. 395/311
[58] Field of Search .................................................. 395/311

[56] References Cited

U.S. PATENT DOCUMENTS

| | | |
|---|---|---|
| 4,227,245 | 10/1980 | Edbland et al. . |
| 4,458,309 | 7/1984 | Wilder, Jr. . |
| 4,459,656 | 7/1984 | Wilder, Jr. . |
| 4,521,849 | 6/1985 | Wilder, Jr. . |
| 4,736,362 | 4/1988 | Clark et al. .................... 370/58 |
| 4,779,194 | 10/1988 | Jennings et al. . |
| 4,805,089 | 2/1989 | Lane et al. . |
| 4,851,998 | 7/1989 | Hospodor . |
| 4,905,171 | 2/1990 | Kiel et al. . |
| 4,939,724 | 7/1990 | Ebersole . |
| 4,944,038 | 7/1990 | Hardy et al. . |
| 4,980,824 | 12/1990 | Tulpule et al. . |
| 5,035,302 | 7/1991 | Thangavelu . |
| 5,062,055 | 10/1991 | Chinnaswamy et al. . |
| 5,067,107 | 11/1991 | Wade . |
| 5,072,376 | 12/1991 | Ellsworth . |
| 5,077,763 | 12/1991 | Gagnoud et al. . |
| 5,079,760 | 1/1992 | Nemirovsky et al. . |
| 5,084,871 | 1/1992 | Carn et al. . |
| 5,365,514 | 11/1994 | Hershey et al. .................... 370/17 |

FOREIGN PATENT DOCUMENTS

| | | |
|---|---|---|
| 0537743 | 10/1992 | European Pat. Off. . |
| 61-53855 | 3/1986 | Japan . |
| 8602510 | 4/1986 | WIPO . |

Primary Examiner—Jack B. Harvey
Assistant Examiner—David A. Wiley
Attorney, Agent, or Firm—Morgan & Finnegan, LLP; Joseph C. Redmond, Jr.; John D. Flynn

[57] ABSTRACT

A dynamic realtime routing mechanism for a data communications network, which provides an Event Driven Interface to perform realtime routing of data frames over one of a plurality of destination paths. The Event Driven Interface is programmed with control vectors to identify routing bit patterns in the data frames on the data communications network. Enabling signals produced by the Event Driven Interface are applied to the control input of a multiplexer whose data input is connected to the data communications network. The multiplexer will steer the data frames from the data communications network to one of a plurality of output routing paths, in response to the enabling signals it receives from the Event Driven Interface.

11 Claims, 1 Drawing Sheet

EDI COUPLED TO A MULTIPLEXER

DYNAMIC REALTIME ROUTING IN A DATA COMMUNICATIONS NETWORK

This application is a continuation of Ser. No. 08/187,949, filed on Jan. 26, 1994 now abandoned.

BACKGROUND OF THE INVENTION

1. Technical Field

The invention disclosed broadly relates to the extraction of information from large bodies of data for high speed communication facilities, and more particularly relates to the dynamic realtime routing of data frames in a data communications network.

2. Related Patent Applications

This patent application is related to the copending U.S. patent application Ser. No. 08/024,572, filed Mar. 1, 1993, now U.S. Pat. No. 5,375,070 entitled "Information Collection Architecture and Method for a Data Communications Network," by J. G. Waclawsky, et al., assigned to the IBM Corporation and incorporated herein by reference.

This patent application is also related to the copending U.S. patent application Ser. No. 08/024,563, filed Mar. 1, 1993, now abandoned entitled "Event Driven Interface for a System for Monitoring and Controlling a Data Communications Network," by P. C. Hershey, et al., assigned to the IBM Corporation and incorporated herein by reference.

This patent application is also related to the copending U.S. patent application Ser. No. 08/024,542, filed Mar. 1, 1993, now U.S. Pat. No. 5,493,689 entitled "System and Method for Configuring an Event Driven Interface and Analyzing Its Output for Monitoring and Controlling a Data Communications Network," by J. G. Waclawsky, et al., assigned to the IBM Corporation and incorporated herein by reference.

This patent application is also related to the copending U.S. patent application Ser. No. 08/138,045, filed Oct. 15, 1993, now U.S. Pat. No. 5,586,266 entitled "System and Method for Adaptive, Active Monitoring of a Serial Data Stream Having a Characteristic Pattern," by P. C. Hershey, et al., assigned to the IBM Corporation and incorporated herein by reference.

3. Background Information

This invention is related to the copending U.S. patent application Ser. No. 08/024,575, filed Mar. 1, 1993 now U.S. Pat. No. 5,365,514 entitled "Event Driven Interface for a System for Monitoring and Controlling a Data Communications Network," by P. C. Hershey, et al., assigned to the IBM Corporation and incorporated herein by reference.

The above cited copending patent application by Hershey, et al. describes the Event Driven Interface which is a mechanism for identifying bit patterns in the serial bit stream of a data communications network. The Event Driven Interface performs pattern recognition based upon a program defined by control vectors. The Event Driven Interface has a input connected to the data communications network for receiving the serial bit stream and for performing a logical pattern recognition on the serial bit stream to produce event vector signals as an output in response to the identification of specific, predefined patterns in the bit stream.

It would be useful to apply the realtime pattern recognition capability of the Event Driven Interface, to the problem of performing realtime routing of data frames and other portions of the serial bit stream in the data communications network.

OBJECTS OF THE INVENTION

It is therefore an object of the invention to perform dynamic realtime routing of data frames in a data communications network.

It is still another object of the invention to perform realtime dynamic routing of serial bit streams in a data communications network.

SUMMARY OF THE INVENTION

These and other objects, features and advantages are accomplished by the invention. The invention is the use of an Event Driven Interface to perform routing selection functions in a data communications network. The data communications network will transmit data frames which include routing information in a segment of the data frame. The Event Driven Interface has an input connected to the network for receiving the serial bit stream and for performing pattern recognition on the serial bit stream based upon a programmed set of logic paths defined by control vectors. In accordance with the invention, a plurality of programmed logic paths in the Event Driven Interface produced corresponding output enabling signals which are applied as the steering signals to a multiplexer. The multiplexer has a data input which is coupled to the data communications network, for receiving a data frame and for steering the data frame out onto one of a plurality of destination paths based upon the enabling signal applied to the multiplexers' control inputs from the Event Driven Interface. In order to accommodate data frames whose routing information lies encapsulated within the body of the data frame, a buffer can be included between the data input of the multiplexer and the network, to buffer the part or all of the data frame until sufficient logic processing of the routing information is performed by the Event Driven Interface, such as is necessary to apply the appropriate enabling signal to the control input of the multiplexer. In this manner, realtime routing of data frames on the data communications network, can be accomplished.

DESCRIPTION OF THE FIGURES

These and other objects, features and advantages will be more fully appreciated with reference to the accompanying figures.

DISCUSSION OF THE PREFERRED EMBODIMENT

Figure 1:
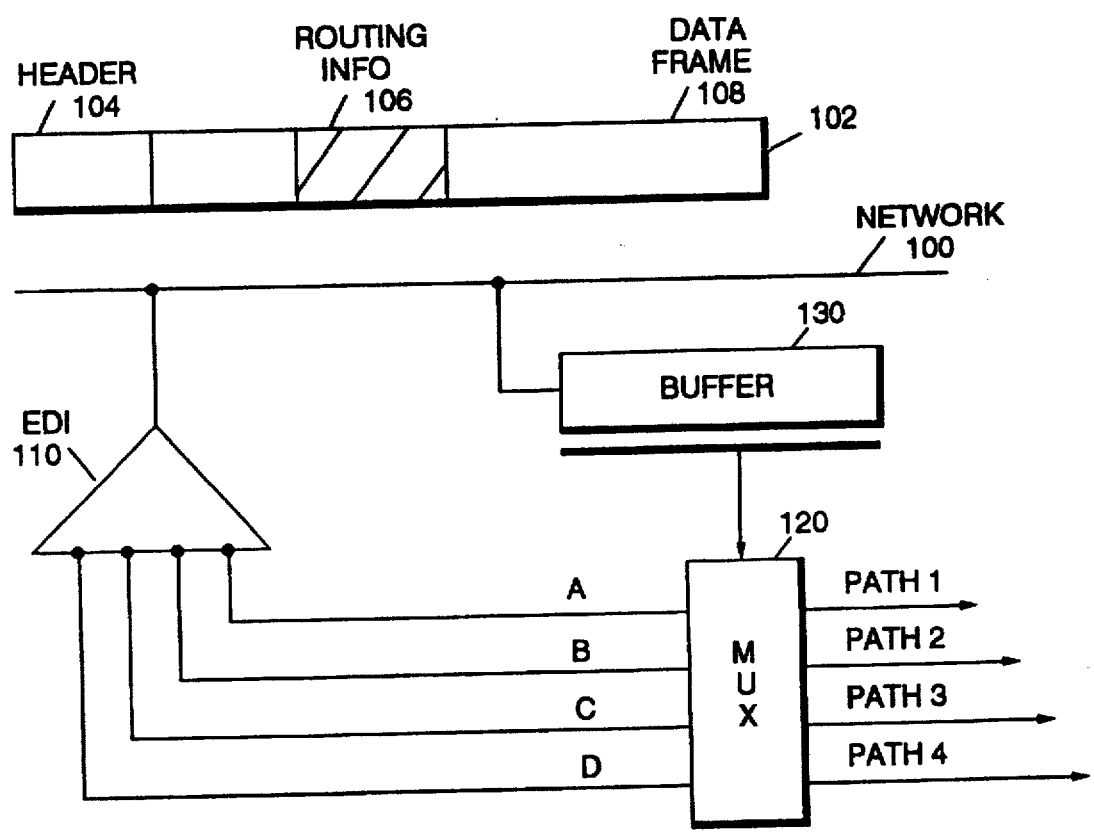
FIG. 1 is a schematic block diagram of the invention, showing the Event Driven Interface coupled to a multiplexer, for providing pasturing signals for a data frame received off the network.

The problem solved is how to route packets in a serial data stream to a plurality of destinations in realtime. In addition, the problem of how to switch from a first routing mechanism to a second routing mechanism in realtime, using inband information.

This invention disclosure relates to the Event Driven Interface invention which is described in the copending U.S. patent application Ser. No. 08/024,575 now U.S. Pat. No. 5,365,514. In that patent application, the Event Driven Interface is described, which is a logic tree whose input is connected to a serial data stream. The logic tree is configured so that individual patterns of binary bits can be identified and when they are identified, they trigger a count.

In the invention disclosed in this disclosure, the Event Driven Interface has its output signal connected as a control input to a multiplexer. The input of the multiplexer is connected to the serial data stream. In this manner, the Event Driven Interface logic tree can identify individual destination address bit patterns, and output an appropriate control signal to the multiplexer, thereby switching the destination connection for the serial data stream to the intended destination location whose address is represented by the data pattern in the bit stream.

As a matter of definition, packets are referred to by other terms in the data communications industry, for example data packets can be "cells," they can be protocol data units, they can be path information units, they can be frames. These various terms refer to the same type of entity, that is a series of bits in a bit stream which are considered as a unit and routed as a unit from an origin to a destination in the network.

FIG. 1 shows the network 100 which communicates data frames such as the data frame 102 which includes a header portion 104, a routing information portion 106 and other information portion 108. The Event Driven Interface (EDI) 110 has its input connected to the network 100. The Event Driven Interface is described in greater detail in the copending patent application Hershey, et al. cited above. Each respective logic path defined by the control vectors in the Event Driven Interface 110, will have a corresponding output terminal. Each corresponding output terminal will produce an enabling signal. The Event Driven Interface 110 is programmed to identify bit patterns corresponding to various routing paths such as path 1, path 2, path 3 and path 4 in FIG. 1. The routing information portion 106 of the data frame 102, will have a characteristic bit pattern corresponding to each of the respective paths 1, 2, 3 and 4. In accordance with the invention, the Event Driven Interface 110 will identify each respective routing information bit pattern, and produce a corresponding enabling signal on one of the enabling lines A, B, C or D which are applied to the multiplexer 120.

Also connected to the network 100 is the buffer 130 which will buffer a part or all of the data frame 102 at least until the bit pattern from the routing information 106 has been deciphered by the Event Driven Interface 110. The output of the buffer 130 is applied to the data input of the multiplexer 120. When sufficient bit pattern for the routing information 106 in the data frame 102, has been deciphered by the Event Driven Interface 110, a corresponding enabling signal is output on one of the enabling lines A, B, C or D to the multiplexer 120, and at that time, the contents of the buffer 130, which contain the data frame 102, can be output on the selected one of the several paths 1, 2, 3 or 4. In this manner, realtime routing of the data frame 102 can be performed in an improved manner.

Although a specific embodiment of the invention has been disclosed, it will be understood by those having skill in the art that changes can be made to the specific embodiment without departing from the spirit and the scope of the invention.

What is claimed is:

1. A system for monitoring and controlling a data communications network which communicates a serial stream of binary bits having a characteristic pattern for data frames which include routing information, a dynamic, real-time, routing means, comprising:

a programmable digital filter having an input coupled to said data communications network and a plurality of output lines, the filter receiving the serial stream and programmed to identify routing bit patterns in said routing information of said data frames, for generating within the filter an enabling signal on a discrete output line in response to identifying said routing bit patterns within the serial stream;

a data routing multiplexer having a plurality of control inputs solely and directly coupled to said discrete outputs of said filter, said multiplexer having a plurality of output paths, for outputting said serial bit stream over one of said plurality of output paths in response to said enabling signal received from said filter; and a data frame buffer having an input coupled to said data communications network and an output coupled to said data input of said multiplexer, for buffering said data frame, the buffer storing the serial stream in the buffer until the filter provides the enable signal to the multiplexor whereupon the contents of the buffer are directed to an output path from the multiplexer solely according to the enable signal present on the discrete output line from the filter.

2. The system of claim 1 wherein the routing information is in-band information.

3. The system of claim 2 wherein the filter switches the enabling signal from one output line to another according to the recognized bit pattern.

4. The system of claim 3 wherein the output path for the serial stream from the multiplexer is selected by the filter using in-band information.

5. The dynamic, real-time, routing means of claim 1 wherein the buffer receives and stores part or all of the data frame until the filter processes the characteristic pattern in the frame to generate the enable signal for directing the multiplexor over an output line to receive and route the buffered frame to an output path identified by the enable signal.

6. The dynamic, real time, routing means of claim 5 wherein the filter is programmed to identify different characteristics patterns in the data frame for directing the multiplexor to route the buffered frame over different output paths according to the characteristic pattern identified by the filter.

7. In a system for monitoring and controlling a data communications network which communicates a serial stream of binary bits having characteristic patterns for data frames which include routing information in-band a channel, a method for dynamic, real-time, routing of the serial stream of binary bits into different data paths comprising the steps of:

a) supplying the serial stream of binary bits on the network to a programmable digital filter having a plurality of output lines;

b) programming the digital filter to recognize bit patterns within a frame as a destination address for the frame;

d) generating within the programmable digital filter, using a recognized bit pattern within the frame, an output as an enabling signal for directing the serial stream of binary bits to a discrete output line according to the recognized bit pattern within the frame;

e) directly supplying the enabling signal over the discrete output line to a data routing multiplexor device;

f) storing the serial stream of bits in a buffer;

g) further supplying the serial stream of binary bits stored in the buffer directly to the data routing multiplexor device when the enabling signal is provided to the data routing multiplexor device over the discrete output line; and h) outputting the serial stream from the data routing multiplexor device to a data path solely according to the enabling signal on the discrete output line.

8. The method of claim 7 further comprising the step of programming the digital filter to generate the enable signal using in-band information.

9. The method of claim 8 further comprising the step of switching the output line according to the bit pattern recognized by the digital filter.

10. The method of claim 9 wherein the output line is selected independently on a per frame or packet basis.

11. The method of claim 10 further comprising the step of providing 2 continuous output lines for the enable signal.

* * * * *